US012754923B2

(12) United States Patent
Arora et al.

(10) Patent No.: US 12,754,923 B2

(45) Date of Patent: Oct. 6, 2026

(54) SYSTEM AND METHOD FOR ORGANIZATION SEMANTICS MODEL

(71) Applicant: Schlumberger Technology Corporation, Sugar Land, TX (US)

(72) Inventors: Hemant Arora, Houston, TX (US); Jamie Cruise, London (GB); Purnaprajna Raghavendra Mangsuli, Pune (IN); Prashanth Pillai, Pune (IN); Omkar Anil Gune, Pune (IN)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 19/207,971

(22) Filed: May 14, 2025

(65) Prior Publication Data

US 2025/0355887 A1 Nov. 20, 2025

Related U.S. Application Data

(60) Provisional application No. 63/647,699, filed on May 15, 2024.

(51) Int. Cl.

| | |
|---|---|
| ***G06F 16/00*** | (2019.01) |
| ***G06F 16/2452*** | (2019.01) |
| ***G06F 16/2453*** | (2019.01) |
| ***G06F 16/2458*** | (2019.01) |

(52) U.S. Cl.

CPC .... *G06F 16/2471* (2019.01); *G06F 16/24522* (2019.01); *G06F 16/24542* (2019.01)

(58) Field of Classification Search

CPC ........... G06F 16/2471; G06F 16/24522; G06F 16/24542; G06F 16/3344; G06F 16/90332

See application file for complete search history.

(56) References Cited

U.S. PATENT DOCUMENTS

| | | | | |
|---|---|---|---|---|
| 9,218,431 | B2 * | 12/2015 | Bascom ................ | G06F 16/288 |
| 11,138,519 | B1 * | 10/2021 | Giri ........................ | G06N 20/00 |
| 2007/0071209 | A1 * | 3/2007 | Horvitz ................ | G06Q 10/109 379/201.06 |
| 2007/0094661 | A1 * | 4/2007 | Baird ..................... | G06Q 10/06 718/102 |
| 2008/0281814 | A1 * | 11/2008 | Calistri-Yeh ............ | G06F 16/36 707/999.005 |

(Continued)

*Primary Examiner* — Noosha Arjomandi

(74) *Attorney, Agent, or Firm* — Kyle R. Miiller

(57) ABSTRACT

The present disclosure relates to a method. The method includes receiving resource reference data corresponding to oil and gas resources. The method also includes obtaining, from a first database, a first plurality of resource data associated with a first organization. Further, the method includes obtaining, from a second database different than the first database, a second plurality of resource data associated with a second organization. Further still, the method includes generating an organization semantics model based on the reference data, the first plurality of resource data, and the second plurality of resource data, wherein the organization semantics model is a language-learning model configured to generate a first response based on a received query corresponding to the first organization, and wherein the organization semantics model is configured to generate a second response based on the received query corresponding to the second organization.

20 Claims, 7 Drawing Sheets

(56) References Cited

U.S. PATENT DOCUMENTS

| | | | | |
|---|---|---|---|---|
| 2013/0332240 | A1* | 12/2013 | Patri | G06Q 10/06 705/7.36 |
| 2015/0278407 | A1 | 10/2015 | Vennelakanti | |
| 2018/0308487 | A1 | 10/2018 | Goel | |
| 2021/0301659 | A1* | 9/2021 | Al Shahri | E21B 49/087 |
| 2022/0229994 | A1* | 7/2022 | Sharma | H04L 51/18 |
| 2022/0238103 | A1* | 7/2022 | Madhusudhan | G10L 15/16 |
| 2022/0309037 | A1* | 9/2022 | Gutierrez | G06F 16/16 |
| 2023/0034011 | A1* | 2/2023 | Sarkar | G06F 16/3344 |
| 2023/0060252 | A1* | 3/2023 | Bly | G06F 16/24578 |
| 2023/0350885 | A1 | 11/2023 | Lai | |
| 2023/0418857 | A1* | 12/2023 | Pickens | G06F 40/10 |
| 2024/0296352 | A1* | 9/2024 | Yanosy, Jr. | G06N 5/02 |
| 2024/0394251 | A1* | 11/2024 | Brende | G06F 11/3409 |
| 2024/0394291 | A1* | 11/2024 | Nelson | G06F 16/3344 |
| 2025/0005021 | A1* | 1/2025 | Mudulodu | G06F 16/24534 |
| 2025/0355887 | A1* | 11/2025 | Arora | G06F 16/2471 |
| 2025/0382877 | A1* | 12/2025 | Johnson | E21B 49/008 |

* cited by examiner

SYSTEM AND METHOD FOR ORGANIZATION SEMANTICS MODEL

CROSS-REFERENCE TO RELATED APPLICATION

This application claims benefit of U.S. Provisional Patent Application No. 63/647,699, entitled "SYSTEM AND METHOD FOR ORGANIZATION SEMANTICS MODEL," filed on May 15, 2024, which is hereby incorporated by reference in its entirety for all purposes.

BACKGROUND

The present disclosure relates generally to document topic analysis and similarity searching and, more specifically, to techniques for providing a semantic search platform to enable searching, browsing, visualizing, and curating structured data, semi-structured data, unstructured data, and so forth.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern organizations often produce and manage a large amount of data. The data may present in documents, such as reports (e.g., sales reports, inspection reports), knowledge articles, promotional materials, user manuals, and so forth. Additionally, the data may record measurements associated with various assets of the company. In an oil and gas organization context, the assets may include completed wells, geological areas for potential drilling, drilling equipment, production equipment, and the like. In any case, the data may include details or discussion related to one or more topics. However, since the amount of data produced and managed by the organization may be enormous, it can be difficult for the organizations to organize the data. Further, it may be difficult for a user to navigate the large amounts of data and identify topics of interest. Further, it can also be challenging for a user to find similar or related data within the large number of documents. This can lead to inefficiencies and additional operational costs as users can spend inordinate amounts of time searching and reviewing documents in an attempt to locate particular topics and/or related data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one aspect, the present disclosure relates to a method. The method includes receiving resource reference data corresponding to oil and gas resources. The method also includes obtaining, from a first database, a first plurality of resource data associated with a first organization. Further, the method includes obtaining, from a second database different than the first database, a second plurality of resource data associated with a second organization. Further still, the method includes generating an organization semantics model based on the reference data, the first plurality of resource data, and the second plurality of resource data, wherein the organization semantics model is a language-learning model configured to generate a first response based on a received query corresponding to the first organization, and wherein the organization semantics model is configured to generate a second response based on the received query corresponding to the second organization.

In one aspect, the present disclosure relates to a system. The system includes a first database storing a first plurality of resource data associated with a first organization. The system also includes a second database different than the first database, wherein the second database stores a second plurality of resource data associated with a second organization. Further, the system includes an organization semantics subsystem comprising one or more processors. The one or more processors are configured to receive an input query; determine an optimal action plan comprising a sequence of steps to be executed to address the input query; select one or more tools, agents, or workflows to perform defined tasks at each step; synthesize responses from the selected one or more tools, agents, or workflows to generate a summarized response; and generate a modified response comprising a subset of the synthesized responses generated from the first database or the second database.

In one aspect, the present disclosure relates to a method. The method includes receiving an input query. The method also includes identifying an entity associated with the query. Further, the method includes retrieving a data schema based on the entity. Further still, the method includes generating a structured query language input based on the data schema.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
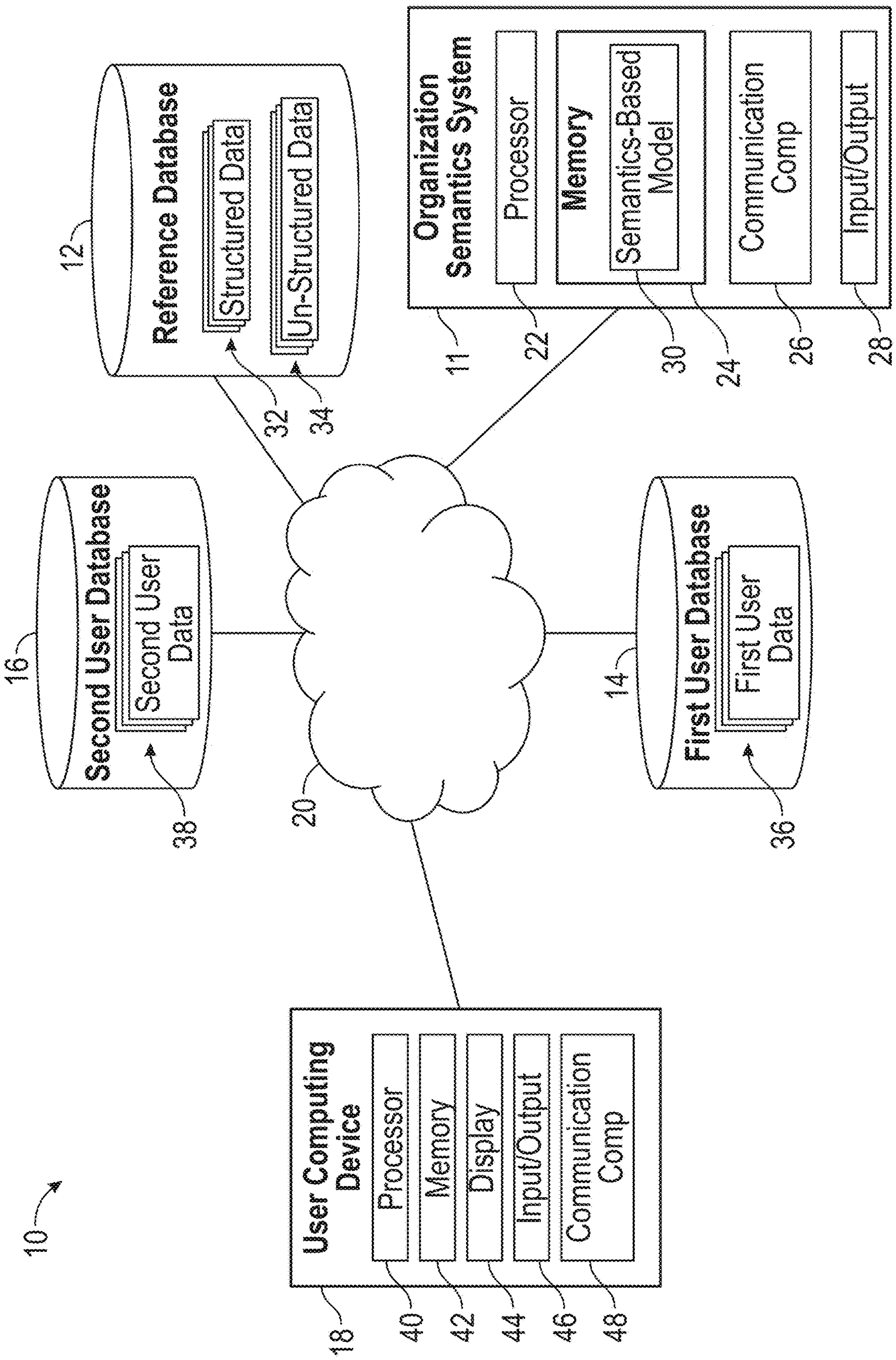
FIG. 1 is a diagram of an organization semantics system implemented in a client-server architecture, in accordance with embodiments of the present technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a", "an", and "the" are intended to mean that there are one or more of the elements. The terms "comprising", "including", and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to describe certain embodiments more clearly.

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed or are caused to be performed, for example, by a computing system (i.e., solely by the computing system, without human intervention). Indeed, it will be appreciated that the analysis and control system described herein may be configured to perform any and all of the data processing functions described herein automatically.

In addition, as used herein, the term "substantially similar" may be used to describe values that are different by only a relatively small degree relative to each other. For example, two values that are substantially similar may be values that are within 10% of each other, within 5% of each other, within 3% of each other, within 2% of each other, within 1% of each other, or even within a smaller threshold range, such as within 0.5% of each other or within 0.1% of each other.

As mentioned above, organizations may generate large amounts of data. Further, the data may be structured (e.g., data organized in databases or schemas using SQL) or non-structured data (e.g., series of documents, PDFs, images, log files of seismic data, articles, reports, and the like). While it may be advantageous to incorporate all of this data into databases, the large amount of data makes onboarding data to these environments difficult. For example, the data may be provided by a variety of sources (e.g., other organizations), and the data may have formats specific to the sources. Accordingly, when an organization desires to build a database to store this data, organizations perform data ingestion, that includes reformatting the data to a particular form, quality controlling it, matching the format of the new system, and so on, which utilizes a large amount of resources (e.g., manhours), and thus is expensive.

It is presently recognized that large language models may be employed to facilitate the data ingestion. Generative AI (Gen AI) tools, such as ChatGPT, utilize large language models (LLMs) that enable users to converse with AI. While such Gen AI tools are excellent at providing broad information, it is presently recognized that it may be difficult to implement existing LLM tools (e.g., Gen AI) in organizations that store and manage sensitive information. For example, organizations may use organization-specific language, and the meanings of certain organization-specific words and phrases (e.g., organization-specific semantic terminology) may be lost when an LLM is trained on data from different organizations that may use the same word, but in different contexts or with different meanings (e.g., resources may refer to natural resources, such as oil, but certain organizations may use resource to refer to employees). Further, the LLMs used by Gen AI are trained using public information and, as such, the resulting LLM may result in leaks of sensitive data to other users of the LLMs.

Accordingly, the present disclosure relates to an organization semantics system that generates and uses a semantics-based model (e.g., a semantics-based LLM, machine-learning models, AI models) trained on organization-specific words and organization-specific data. In this way, the semantics-based model is capable of providing responses (e.g., based on input queries) that are informed by the organization's data, rather than data from another organization. For example, a user may provide a natural language query to the semantics-based model such as "show me all wells completed in 2024, having a depth greater than 200 meters, with a surrounding geological formation including sandstone." As such, the disclosed semantics-based model may provide a user with one or more wells (e.g., a list of wells) managed by the organization or otherwise accessible by the organization (e.g., through a joint venture). As another non-limiting example, a user may provide a natural language query to the semantics-based model such as "tell me which wells are the best candidates for intervention". In turn, the disclosed semantics based-model may provide a user with a ranked listing of wells suitable for intervention in an oil and gas context (e.g., where "intervention" refers to an operation carried out on an oil or gas well during, or at the end of, its productive life that alters the state of the well or well geometry, provides well diagnostics, or manages the production of the well) as opposed any other non-oil and gas context (e.g., where "intervention" can refer to a meeting of individuals to help another individual struggling with an addiction, for example). Further, the semantics-based model may utilize organization-specific metrics for providing the ranking. In this way, the semantics-based model may aid organizations in managing assets by providing responses tailored to the data that is specific to the particular organization.

At least in some instances, the semantics-based model may be used to assess discrepancies (e.g., gaps, discontinuities, incorrect labels, mistakenly deleted portions, or other irregularities or inconsistencies in data) in data. To do so, the semantics-based model may utilize inferences drawn from training data representing suitable structured and/or unstructured data. For example, the semantics-based model may be capable at identifying gaps in data and transforming the data. Additionally, the semantics-based model may be capable of finding outliers and proposing recommendations to fix the quality of data. As one non-limiting example, the semantics-based model may be capable of receiving a query including a plurality of documents identifying well sites. In turn, the semantics-based model may determine that at least a portion of geolocations corresponding to the documents are incorrect. For example, the semantics-based model may access organization-specific data that indicates a location of different assets. In turn, the semantics-based model may provide a response (e.g., an output) indicating geolocations corresponding to the documents that do not match the location of the assets indicated by the organization-specific data. As one specific non-limiting example, the semantics-based model may receive an input including a partial address. The semantics-based model may provide an output that includes a possible location for the address. Then, based on a subsequently received input (e.g., user input) indicating the correct addresses based on the possible location for the address, a processor may update the geolocation information.

As another non-limiting example, a user may provide a natural query in a window displayed on a computing device (e.g., the user computing device). The query may include a natural language or spoken language, indicating that the user requests a summary based on a search through data (e.g., structured data and unstructured data). For example, the user may desire a summary that can selectively provide more granular information (e.g., via selection of selectable features such as drop-down arrows) that provides information such as location of wells on a map. The semantics-based model may receive this query and generate the summary as the response. The conversation (e.g., the query, the response, and any intervening, prior, or subsequent queries and/or responses) may be saved and accessible by the user or additional users at a different time.

In some embodiments, a window displaying the response may be a user-interface (e.g., a graphical user interface). In some embodiments, the user interface may include features allowing multiple users to provide separate queries, and the user interface may provide a response for each query. For example, each user may submit a query and, after a time delay or an input indicating all queries are submitted, the queries may be aggregated as a single query and provided to the semantics-based model as an input. In some embodiments, the user interface may be capable of generating a single response based on multiple queries. It is noted that enabling the conversation to be accessible by additional users may improve efficiencies of certain business operations by enabling the users to collaborate and/or share responses. Moreover, because the response may be tailored to the organization where the users work, the users will receive responses that are relevant to the users. Users at a different organization may provide a generally similar query. However, since the users are at a different organization, they may receive a different response (e.g., the response is generated based on the data for the other organization) than the response received by users of another organization.

Accordingly, the disclosed techniques aid organizations in managing and correcting data. It should be noted that the above examples are meant to be non-limiting. In general, the disclosed semantics-based model may be used for smart data ingestion, quality control, natural language conversations with users using organization-specific data, discovering and consuming information, and so on. Further, the disclosed techniques may aid users in performing operations such as updating data, changing access, approving in technical assurance operations. Further still, the disclosed techniques may aid users in curating the discovered data into data packages that may be consumed into energy industry standard applications such as Petrel, Techlog and others.

With the foregoing in mind, FIG. 1 is a block diagram of a system in accordance with the present disclosure. As shown, the system 10 includes an organization semantics system 11, a reference database 12, a first user database 14 (e.g., a first organization database), and a second user database 16 (e.g., a second organization database). In general, the organization semantics system 11 communicates with a user computer device 18 and/or utilizes data stored in the reference database 12, the first user database 14, the second database 16, or a combination thereof, via a network 20, to provide responses as discussed herein. As shown, in certain embodiments, the organization semantics system 11 may include a processor 22, a memory 24 or other storage, communication component(s) 26, and input/output 28. As shown, the memory 24 may store the semantics-based model (e.g., organization semantics model) described in greater detail herein.

As shown, the reference database 12 stores structured data 32 and unstructured data 34. In some embodiments, the reference database 12 may be a publicly-accessible oil and gas database platform (e.g., open subsurface data universe (OSDU)) or other database platform storing data in one or more formats. The structured data 32 and the unstructured data 34 may generally include non-sensitive information that may be relevant for the organizations associated with the first user database 14 and the second user database 16. As shown, the first user database 14 stores first user data 36. In general, the first user data 36 may include structured data and/or unstructured data. In some embodiments, the first user data 36 may include sensitive information that may be useful for generating responses for queries submitted by a first organization that manages or is otherwise associated with the first user database 14 using the semantics-based model 30. As shown, the second user database 16 stores second user data 38. In general, the second user data 38 may include structured data and/or unstructured data. In some embodiments, the second user data 38 may include sensitive information that may be useful for generating responses for queries submitted by a second organization that manages or is otherwise associated with the second user database using the semantics-based model 30. However, while both the first organization and the second organization utilize the semantics-based model 30, the organization semantics system 11 may generate responses (e.g., implementing the semantics-based model 30) for the organizations that are tailored based on the data (e.g., the first user data 36 or the second user data 38) specific to the particular organization. Accordingly, the responses may utilize terminology (e.g., words, phrases, acronyms, and the like) consistent with a particular organization's usage, although the terminology may carry different meanings across the different organizations. As noted above, certain existing Gen AI implementations may be incapable of generating organization-specific terminology due to being trained to provide generalized answers to queries.

As shown, the user computing device 18 may include a processor 40, a memory 42, a display 44, an input/output 46, and communication component 48. In general, the components of the user computing device 18 may be generally similar to the components of the organization semantics system 11. The display 44 of the user computing device 18 may display a user interface as described herein that may facilitate conversations with the organization semantics system 11 that is implementing the semantics-based model 30 as described in greater detail herein.

Figure 2:
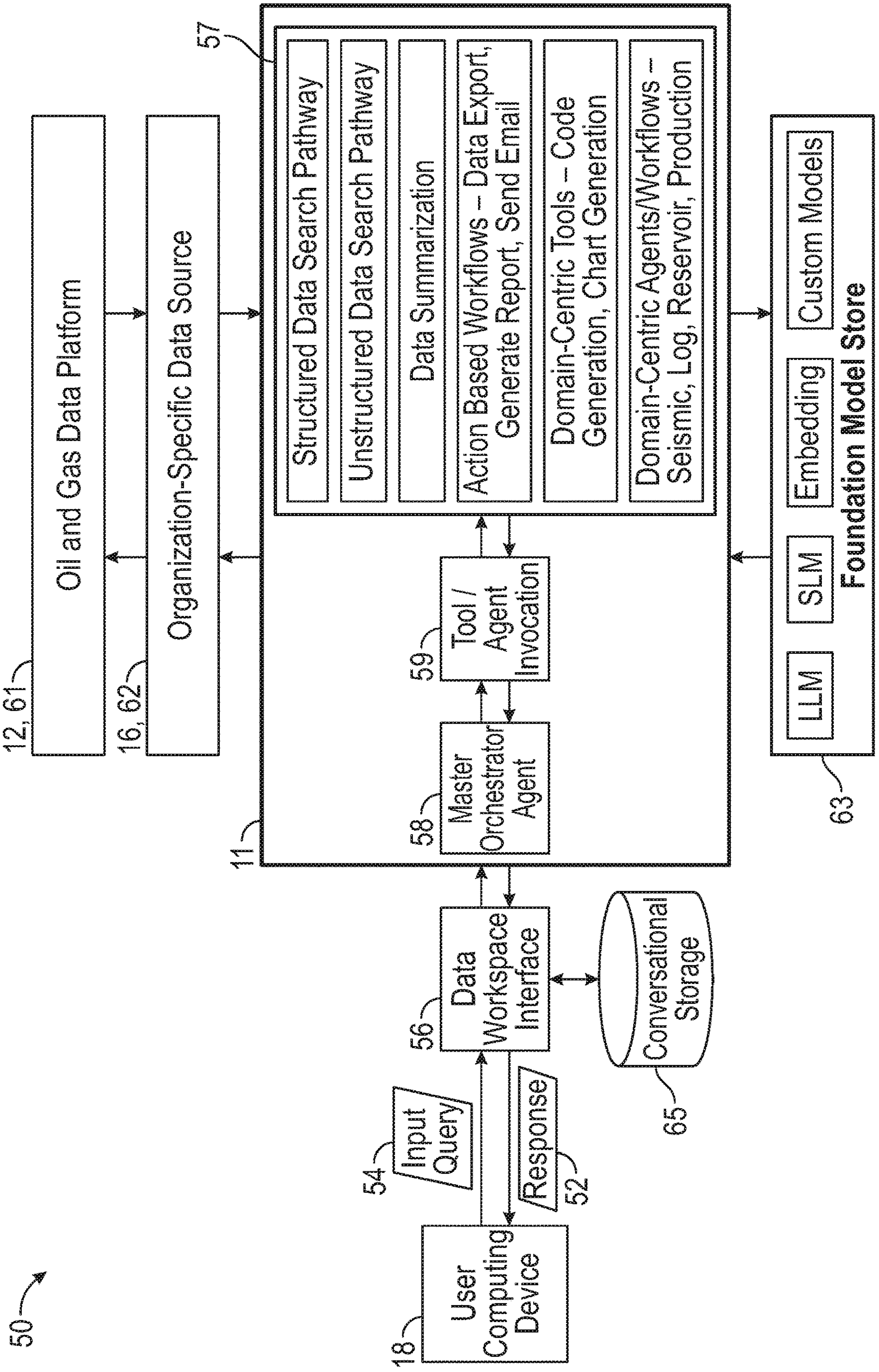
FIG. 2 is a flow diagram illustrating an embodiment of the organization semantics system providing a response based on a received query, in accordance with embodiments of the present technique.

FIG. 2 is a flow diagram 50 illustrating an embodiment of the organization semantics system 11 providing a response 52 based on a received query 54, in accordance with embodiments of the present technique. In particular, FIG. 2 shows the user computing device 18 providing the input query 54 via the data workspace interface 56. In general, the data workspace interface 56 is a user interface provided on the display 44 of the user computing device 18. The data workspace interface 56 may facilitate searching data, browsing data, visualizing data and/or responses, and curating responses for a particular organization. For example, the data workspace interface 56 may enable a user to browse and visualize data in table, map and organization proprietary 2D or 3D data viewers or visualizers. The data workspace interface 56 may be displayed on multiple user computing devices associated with an organization and, thus, enable collaboration as described herein. For example, the data workspace interface 56 may be capable of receiving multiple input queries 54 from different user computer devices 18, and assembling the different input queries 54 into a single response 52. The response 52 may include domain summaries from different types of documents like well reports, production reports, well completion reports, and so on.

As shown, the input query 54 may be provided to an AI based master orchestrator agent 58 of the organization semantics system 11 via the data workspace interface 56. The master orchestrator agent 58 determines the optimal action plan that consists of a sequence of steps to be followed to address the input query 54. The master orchestrator agent 58 then signals the tool/agent/workflow invocation agent 59 to determine the right tool/agent/workflow to be invoked. Several example tools, agents, and workflows 57 are shown in FIG. 2. They may include pathways to search either structured data pathways (first organization) or unstructured data pathways (second organization); perform summarization tasks on retrieved document data; perform target actions that includes but not limited to exporting data, report generation; invoking domain-centric tools or domain-centric workflows targeted at interpretation of domain data on either seismic, well log, reservoir, well tests, hydrocarbon production data or any related data types. Techniques utilizing the structured data pathways are described with respect to FIG. 4, and techniques utilizing the unstructured data pathways are described with respect to FIGS. 5A and 5B. The organization semantics system 11 may be capable of utilizing well attributes using commonly known names, geospatial entities like Country, Field, Basin, refine with quality rules defined using natural language to perform the operations described herein. In some embodiments, the organization semantics system 11 may perform an action-based workflow that includes obtaining data from an organization-specific data source 62 (e.g., the first user database 16). Additionally or alternatively, the organization semantics system 11 may communicate with an oil and gas reference database 61 (e.g., the reference database 12) that stores information applicable to a variety of organizations (e.g., information associated with standards, while the organization-specific data sources 62 (e.g., the first user database 16) to a specific organization. Ultimately, the organization semantics system 11 generates the response 52 by connecting to foundation models provisioned by a foundation model store 63. The foundation model store 63 may store one or more models that may be utilized (e.g., by the organization semantics system 11) to generate the response 52. For example, the foundational model store 63 may include an LLM model, an SLM model, embedding information (e.g., relationships between numerical representations of data), custom models (e.g., trained and/or provided by the organization), or a combination thereof.

In general, the semantic system response 52 is the output of the semantics-based model 30 described in FIG. 1. The LLM response 52 may include a visualization of data, an assembled document, an interactive document to display using the data workspace interface 56, a corrected document, a list of missing information associated with the input query 54, and the like. The LLM response 52 may be utilized via the data workspace interface 56 to generate an additional LLM response 52. For example, as described above, the LLM response 52 may indicate a list of potential locations for an incorrect or missing location provided in the input query 54. Accordingly, the additional LLM response 52 may include the correct information (e.g., after receiving a subsequent user input).

As shown, the data workspace interface 56 may communicate with a conversational storage 65. The conversational storage 65 may store historical information of one or more conversations (e.g., one or more input queries 54 and one or more response 52 generated based on the one or more input queries 54). The organization semantics system 11 may access the historical information to facilitate generating the response 52.

It should be noted that although FIG. 2 depicts the organization semantics system 11 implemented in a client-server architecture, it should be noted that the organization semantics system 11 may also be implemented in serverless architectures.

Figure 3:
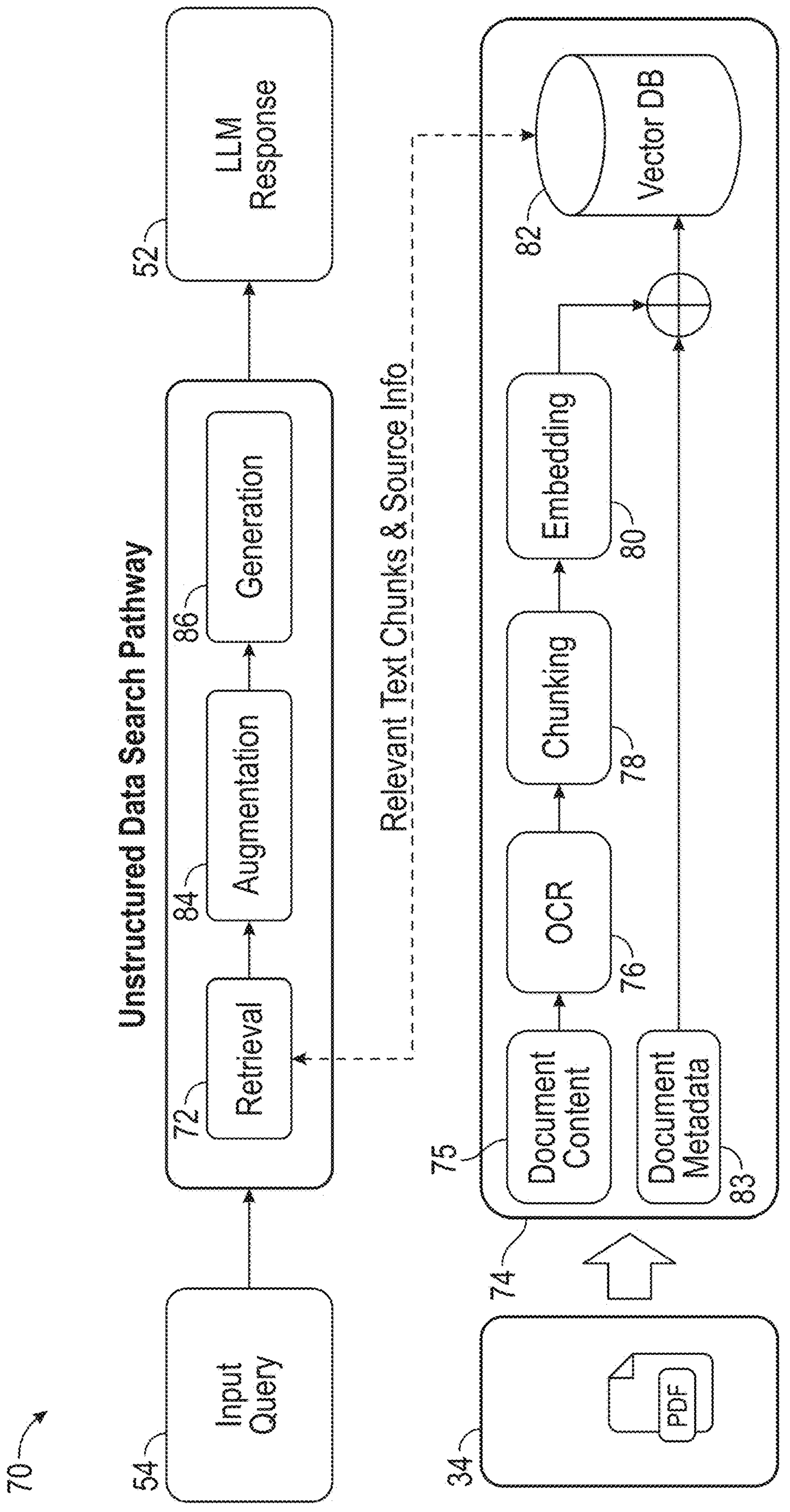
FIG. 3 is a flow diagram illustrating an embodiment of the organization semantics system providing a response based on unstructured data, in accordance with embodiments of the present technique.

FIG. 3 is a flow diagram 70 illustrating an embodiment of the organization semantics system 11 providing a response based on unstructured data 34 (e.g., a text document, a PDF, or other file that includes text or images representing text), in accordance with embodiments of the present technique. As shown, the organization semantics system 11 may retrieve (block 72) the unstructured data 34 indicated by the input query 54. In turn, the organization semantics system 11 may process or analyze the unstructured data 34 (block 74). Processing or analyzing the unstructured data 34 may include utilizing optical character recognition (OCR) techniques (block 76) on the document content 75 (e.g., the text) of the unstructured data 34, chunking techniques (e.g., providing less text than in the initial unstructured data 34, such as providing one or more summaries) (block 78), embedding (block 80), and utilizing the metadata of the unstructured data 34 (e.g., "document metadata") to assemble or otherwise generate a retrieved unstructured data 34 that is ultimately used to generate the LLM response 52. As referred to herein, "chunking techniques" refers to processes of converting text information into smaller text information. In general, the smaller text information includes fewer words than the original text information, while still including context such that the LLM is capable of utilizing the chunk to reduce processing time of text (e.g., reduce memory allocated to the chunk and processing the chunk) while still include enough information for the LLM to determine patterns in the text that indicate context. Chunking techniques include, but are not limited to, tokenization (e.g., breaking text) attention window chunking, internal representation chunking, and so on.

In some embodiments, the analyzed and processed unstructured data 34 and the associated metadata 83 may be provided to a vector database 82, which may facilitate adapting the semantics-based model 30 using a mathematical representation of the unstructured data 34 (e.g., the processed and analyzed unstructured data 34 with the metadata) generated using the vector database. In turn, the semantics system 11 may augment (block 84) the unstructured data 34. Augmenting the unstructured data may include converting the unstructured data into a particular format, tagging portions of the unstructured data with the metadata 83 so that the LLM model is provided more context, and other techniques associated with enhancing unstructured data. Then, at block 86, the semantics system 11 may generate the LLM response 52, which may include assembling a written response in a spoken-language.

Figure 4:
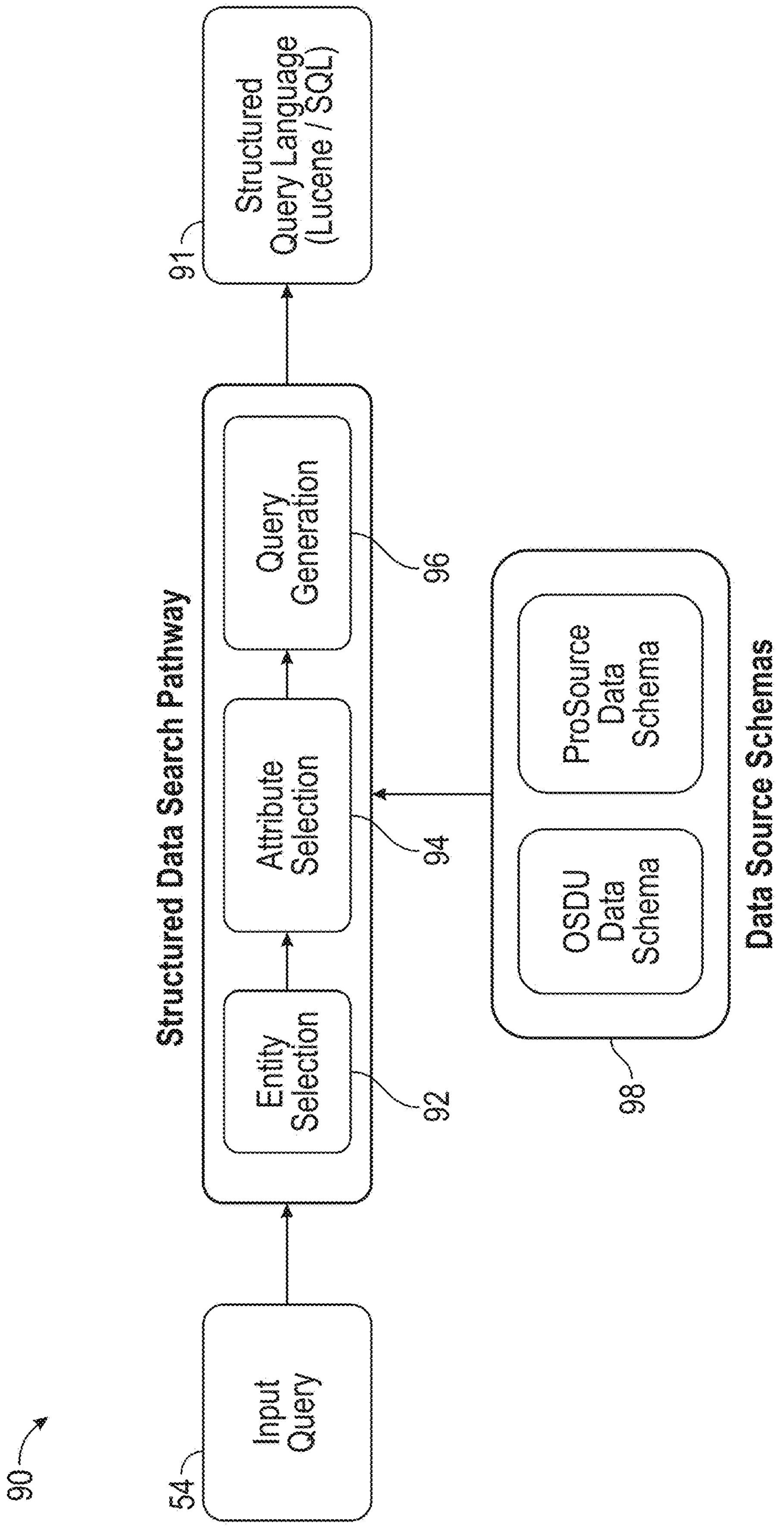
FIG. 4 is a flow diagram illustrating an embodiment of the organization semantics system using organization-specific data, in accordance with embodiments of the present technique.

FIG. 4 is a flow diagram 90 illustrating an embodiment of the organization semantics system 11 using organization-specific data, in accordance with embodiments of the present technique. As shown, the organization semantics system 11 may receive an input query 54 and determine information (e.g., attributes and/or an organization identity) to facilitate generating a structured query language input 91 (e.g., a modified input query) that is utilized by the organization semantics system 11 instead of the input query 54 (e.g., initial input query). The structured query language input 91 may be utilized in accordance with the structured data search pathway (FIG. 2). In general, the flow diagram 90 includes performing a structured data search pathway that includes performing entity selection (block 92), performing attribute selection (block 94), and then query generation (block 96), thereby facilitating the process for ultimately generating the LLM response 52. That is, the organization semantics system 11 may determine the organization (e.g., "entity selection") and attributes (e.g., "attribute selection") based on the input query 54. Using this information, the organization semantics system 11 may assemble the structured query language input 91. As shown, the flow diagram 90 include accessing one or more data source schemas 98. In general, the data source schemas may indicate particular formats for the structured query language input 91 (e.g., OSDU data schema, ProSource data schema, and the like).

As one specific-non-limiting example whereby a natural query by a user is converted into the structured query language input 91 in accordance with the flow diagram 90 of FIG. 4, the input query 54 (e.g., the natural query) may include text that reads "define all wells that are 100 m in depth". In turn, the organization semantics system 11 may generate a structured query language input 91 such as "SELECT * from WELL_TABLE where DEPTH='100"

Figure 5A:
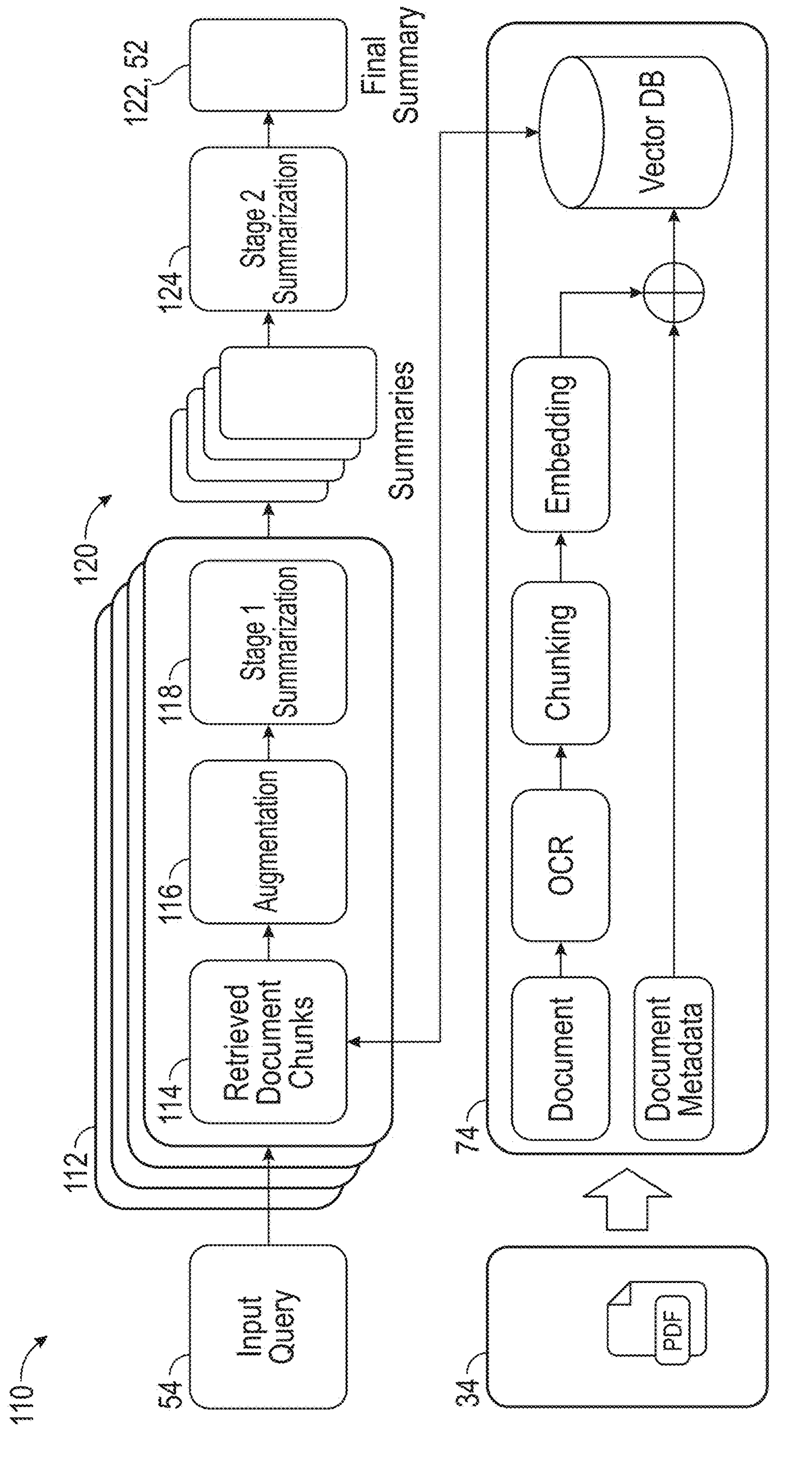
FIG. 5A is a flow diagram illustrating a first embodiment of the organization semantics system generating a document response based on a received query related to multiple documents, in accordance with embodiments of the present technique.

FIG. 5A is a flow diagram 110 illustrating an embodiment of the organization semantics system 11 generating a document response based on a received query related to multiple documents, in accordance with embodiments of the present technique. In general, the flow diagram 110 includes receiving a query (e.g., a prompt to summarize themes in a group of documents). In turn, the organization semantics system 11 performs multiple unstructured data search blocks 112 retrieves document chunks (block 114), which may include similar steps as shown in block 74 of FIG. 3. Block 114 may be utilized in accordance with the unstructured data search pathway (FIG. 2). Then, the organization semantics system 11 may perform augmentation (block 116), which may include the similar steps as shown in block 84 of FIG. 3. After performing augmentation, the organization semantics system 11 may perform a summarization (block 118) of the documents (e.g., chunks or portions of documents) obtained based on block 114, thereby producing multiple document summaries 120. To consolidate the summaries into a consolidated document 122, the flow diagram 110 may include forming an additional summarization (block 124). In this way, the flow diagram 110 may be utilized to retrieve multiple documents from one or more input queries 54 and generate a single summary 122 (e.g., the LLM response 52). In some embodiments, the organization semantics system 11 may output the document summaries 120, and thus, omit block 124.

The query is submitted to the LLM (e.g., semantics-based model 30), which outputs a response 52 that includes summaries of the documents. Data corresponding to the response 52 may be displayed on a suitable interface (e.g., the data workspace interface 56). The user may provide an additional query (e.g., "extract a final summary from summary list") to the semantics-based model 30, which provides the response 52.

Figure 5B:
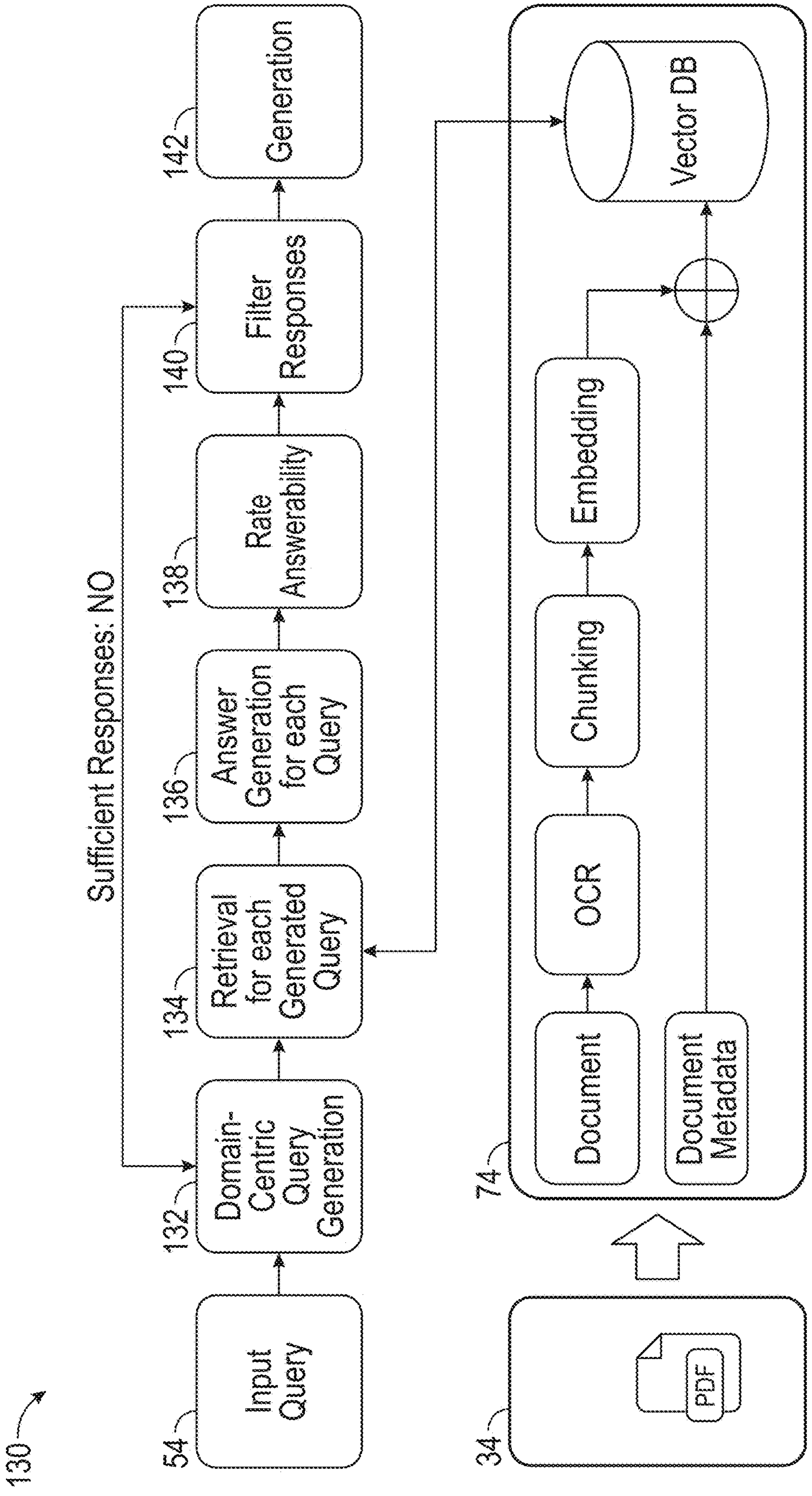
FIG. 5B is a flow diagram illustrating a second embodiment of the organization semantics system generating a document response based on a received query related to multiple documents, in accordance with embodiments of the present technique.

FIG. 5B is another embodiment of the flow diagram 130 illustrating an embodiment of the organization semantics system 11 generating a document response based on a received query related to multiple documents, in accordance with embodiments of the present technique. In general, the flow diagram 130 includes receiving a query (e.g., a prompt to summarize themes in a group of documents). The received query is used to first generate several domain-centric queries (block 132) that pertain to interrogating multiple aspects of the received query. Relevant data corresponding to each of the generated query is retrieved (block 134) from a semantic vector database and used to generate answer (block 136) for each domain-centric query, which may be performed in a similar manner as described with respect to block 74 of FIG. 3. Each of the generated queries and corresponding generated answers are ranked or rated (block 138) based on the answerability. The generated responses are filtered (block 140) based on answerability score. If sufficient responses are generated (e.g., a threshold number of responses have a rating above a threshold), then final response is generated (block 142). If sufficient responses are not generated, a feedback loop to improve domain-centric queries is executed with a limit on the maximum retries.

Figure 6:
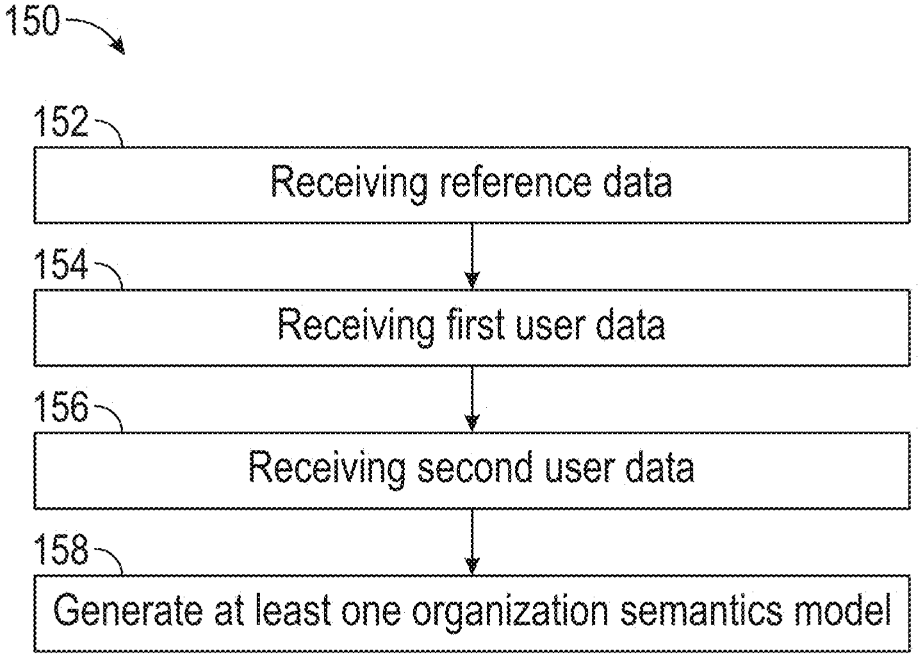
FIG. 6 is a flow diagram illustrating an example process for generating an organization semantics model, in accordance with embodiments of the present technique.

FIG. 6 is a flow diagram illustrating an example process 150 for generating an organization semantics model, in accordance with embodiments of the present technique. As shown, the process 150 includes receiving (block 152) reference data (e.g., from the reference database 12), receiving (block 154) first user data (e.g., from the first database 14), receiving (block 156) second user data (e.g., from the second database 16), and generating (block 158) at least one organization semantics model (e.g., the semantics-based model 30) based on the reference data and the first and second data.

For example, at block 152, the organization semantics system 11 (e.g., the processor 22 of the organization semantics system 11) may receive reference data as training data. In general, the reference data may include data from more-publicly available reference database, such as the reference database 12. The reference data may have a particular data format type and/or include different data types (e.g., seismic log data, NMR logging data, resistivity logging data, and so on), metadata (e.g., geolocation data, data indicating a particular well), and the like.

At block 154, the organization semantics system 11 may receive first user data 36. Further, at block 156, the organization semantics system 11 may receive second user data 38. In general, the first user data 36 and the second user data 38 may indicate particular data type preferences for the organizations, organization-specific data, organization specific terminology, and the like. For example, in some embodiments, the first user data 36 may have a data format type that is specific to or desired by a first organization, and the second user data 38 may have a data format type that is specific to or desired by the second organization.

At block 158, the organization semantics system 11 may generate at least one organization semantics model (e.g., the semantics-based model 30) using the first user data 36, the second user data 38, the reference data, or a combination thereof. In general, generating may include training the semantics-based model 30 such that the semantics-based model 30 stores inferences, correlation, or relationships between organization preferences and the first user data 36, the second user data 38, the reference data, or a combination thereof. For example, the trained semantics-based model 30 may be capable of providing a response (e.g., an output) that is based on or specific to the organization that provided the input, as described herein. In some embodiments, the process 150 may include generating multiple models that are specific to each organization or subgroups/divisions within the organization. For example, the process 150 may only word-based search available on document text without Oil & Gas domain context or relationship of the verbatim, thereby preventing mixing of different terminologies from other enterprises or more general terms used outside of the organization that submitted the query.

Figure 7:
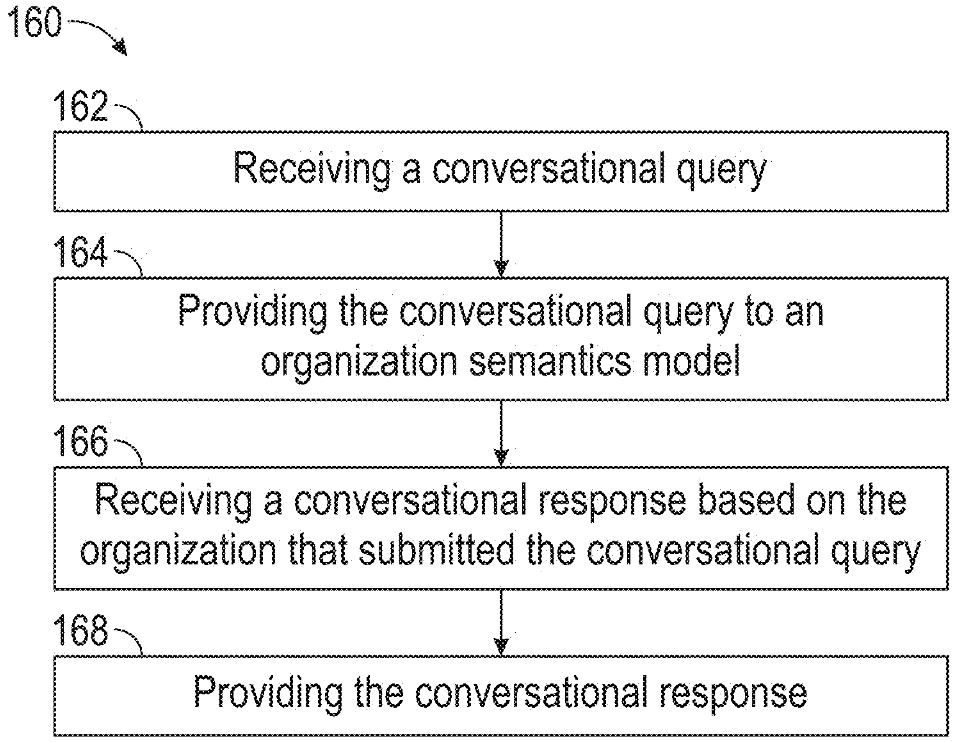
FIG. 7 is a flow diagram illustrating an example process for generating a response to a query using an organization semantics model, in accordance with embodiments of the present technique.

FIG. 7 is a flow diagram illustrating an example process 160 for generating a response to a query using an organization semantics model, in accordance with embodiments of the present technique. As shown, the process 160 includes receiving (block 162) a conversational query, providing (block 164) the conversational query to an organization semantics model, receiving (block 166) a conversational response based on the organization that submitted the conversational query, and providing (block 168) the conversational response to one or more computing devices associated with the received conversational query.

At block 162, the organization semantics system 11 may receive a conversational query. In general, the conversational query may be the input query 54 described herein. The conversational query may include words, phrases, or acronyms specific to an organization. In some embodiments, the conversational query may include data (e.g., structured data and/or unstructured data), such as a set of documents that a user desires to convert to a different format. As another non-limiting example, the data may include a set of well log data or well log reports that a user desires to have access for quality. Accordingly, the conversational query may also include phrases in natural language such as "please review these documents for quality and remove documents that have a quality score below a threshold".

In some embodiments, the conversational query may be an aggregate of multiple queries from different users within an organization. For example, organization semantics system 11 may receive a first query from a first user computing system and a second query from a second user computing system. As such, the organization semantics system 11 may generate a single conversational query that includes the first query and the second query. In some embodiments, the organization semantics system 11 may filter out or remove redundant queries to generate the aggregate query (i.e., the conversational query). In some embodiments, the organization semantics system 11 may output a response for additional input to clarify a submitted query.

At block 164, the organization semantics system 11 may provide the conversational query to the at least one organization semantics model (e.g., the semantics-based model 30). In some embodiments, the organization semantics system 11 may determine information related to the conversational query in a generally similar manner as described in FIG. 4. For example, the organization semantics system 11 may determine the organization that submitted the conversational query.

At block 166, the organization semantics system 11 may receive, as an output, a response (e.g., the response 52 and/or the LLM response 52) from the at least one organization semantics model. In some embodiments, the response may include a summary, visualization, or otherwise modified form of a document as described with respect to FIG. 3.

At block 168, the organization semantics system 11 may provide a conversational response to the user computing device 18. In some embodiments, the conversational response may include phrases in a natural or spoken language. In some embodiments, the conversational response may include a general indication that a response has been generated (e.g., "here is the summary you requested", "here is a list of data that may need further review", "the data recorded on MM-DD-YYYY appears to be corrupted. I have amended the data for your review", and so on). In some embodiments, the conversational response may be presented on an interface (e.g., the data workspace interface 56), thereby aiding the user in interacting with the response generated using the at least one organization semantics model. Accordingly, the user may provide additional queries or inputs to refine the response.

Accordingly, the present disclosure relates to an oil and gas resource query system that facilitates search of oil and gas resources and develop of useful documents (e.g., visualizations, etc.). In some embodiments, the oil and gas resource query system may use proprietary and public ML models to convert document text into embeddings to return domain-oriented results. At least in some instances, attribute of an oil and gas domain entity could be known with different names in varied organizations and sources. Semantic search enables search on these attributes in documents and OSDU data using those known names in natural language. The disclosed techniques may allow user to refine search based on previously asked questions and answers in the same conversation and avoid providing related context repetitively. At least in some instances, the disclosed techniques may aid a user to perform curation activities from the current conversation context like creating data packages from discovered data, updating records, launch domain applications with data in context etc. The disclosed techniques may utilize relationships between resources e.g. Basin->Field->Wellbore, thereby enabling a user to discover entities in natural language query. Further, the disclosed techniques may be capable of generating a visualization in the form of graphs or charts.

The components of this invention include large language models, machine learning models, orchestration frameworks, vector databases, retrieval augmented pipelines, data schemas from OSDU, ProSource and other industry schemas, SLB enterprise data management applications and SLB domain applications. Proprietary Oil & Gas domain-oriented machine learning models may be used to convert document text into embeddings which may be stored in vector database. It may be advantageous to utilize orchestration framework, which may improve efficiency by executing parallel tasks between Machine Learning models, databases & OSDU services & return the result to the end user. For example, due to security concerns, data results may be returned based on what the user is entitled to see. Entitlements are complex patterns based on hierarchy and privileged access that an organization would define on what a particular user can access or not access. The system provides a mechanism whereby role based entitlement can be set in the system for each user, and the system would restrict the results based on that entitlement.

Technical effects include: providing discovery on Oil & Gas domain data in documents, & data platforms: By enabling search based natural language query search on domain documents & data platforms, eliminates the need to search separately in documents & data platforms & manually browse through pages to discover information. Technical effects also include simplified discovery by enabling saving the conversation & retrieving the past search. This in turn reduces computational resources dedicated to parsing information by the LLM. Further technical effects including simplifying data visualization by enabling preview of visualization of data within the conversation & ability to launch in respective viewer. Further still, technical effects include efficient data curation by enabling data quality checks for completeness, accuracy, and robustness that allow the maintenance of information and ensures long term accessibility, preservation, consumption and sharing.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112 (f).

The invention claimed is:

1. A method, comprising:

receiving resource reference data corresponding to oil and gas resources;

obtaining, from a first database, a first plurality of resource data associated with a first organization;

obtaining, from a second database different than the first database, a second plurality of resource data associated with a second organization; and generating an organization semantics model based on the resource reference data, the first plurality of resource data, and the second plurality of resource data, wherein the organization semantics model is a language-learning model configured to receive a query and generate a first response corresponding to the first organization based on the query, wherein the first response utilizes terminology consistent with usage of the first organization, and wherein the organization semantics model is configured to generate a second response corresponding to the second organization based on the query, wherein the second response utilizes terminology consistent with usage of the second organization.

2. The method of claim 1, comprising:

receiving the query;

determining an optimal action plan comprising a sequence of steps to be executed to address the query;

selecting one or more tools, agents, workflows, or a combination thereof to perform defined tasks at each step;

synthesizing responses based on the selected one or more tools, agents, or workflows to generate a summarized response; and generating a modified response comprising a subset of the synthesized responses generated from the first database or the second database.

3. The method of claim 1, wherein the resource reference data, the first plurality of resource data, the second plurality of resource data, or a combination thereof, comprise unstructured data or structured data.

4. The method of claim 1, comprising:

receiving the query;

determining whether the query corresponds to the first organization or the second organization;

generating the first response or the second response based on the input query corresponding to the first organization or the second organization; and outputting the first response or the second response.

5. The method of claim 4, wherein the input query comprises a third plurality of resource data in a first format; and wherein generating the second response comprises:

determining a second format corresponding to the second organization; and converting the third plurality of resource data from the first format to the second format to generate the second response.

6. The method of claim 4, wherein the input query comprises a conversational query in a natural spoken-language.

7. The method of claim 6, wherein the first response or the second response comprise a conversational response in the natural spoken-language.

8. The method of claim 1, wherein the organization semantics model is configured to identify gaps in data based on the resource reference data, the first plurality of resource data, and the second plurality of resource data, or a combination thereof.

9. The method of claim 1, wherein the organization semantics model is configured to restrict content of the first response or the second response based on a role-based entitlement associated with a user that submitted the query.

10. The method of claim 1, further comprising accessing historical information comprising one or more prior queries and one or more prior responses to facilitate generating the first response or the second response.

11. A system, comprising:

a first database storing a first plurality of resource data associated with a first organization;

a second database different than the first database, wherein the second database stores a second plurality of resource data associated with a second organization; and an organization semantics subsystem comprising one or more processors and an organization semantics model, wherein the organization semantics model is a language-learning model trained on the first plurality of resource data and the second plurality of resource data, the organization semantics subsystem configured to:

receive an input query;

determine an optimal action plan comprising a sequence of steps to be executed to address the input query;

select one or more tools, agents, or workflows to perform defined tasks at each step;

synthesize responses from the selected one or more tools, agents, or workflows to generate a summarized response, wherein synthesizing the responses comprises utilizing the organization semantics model to generate organization-specific responses utilizing terminology consistent with usage of the first organization or the second organization based on whether the input query corresponds to the first organization or the second organization; and generate a modified response comprising a subset of the synthesized responses generated from the first database or the second database.

12. The system of claim 11, wherein the organization semantics subsystem is configured to generate the modified response by:

rating each of the synthesized responses; and generating the modified response to include the synthesized responses having a rating that exceeds a threshold.

13. The system of claim 11, wherein the organization semantics subsystem is configured to synthesize the responses by:

identifying unstructured data for responding to the input query;

tagging the unstructured data with metadata; and assembling the synthesized responses using the tagged unstructured data.

14. The system of claim 13, wherein the organization semantics subsystem is configured to assemble the synthesized responses by:

performing an optical character recognition technique on the unstructured data to generate analyzed unstructured data; and assembling the synthesized responses based on the analyzed unstructured data.

15. The system of claim 13, wherein the organization semantics subsystem is configured to assemble the synthesized responses by:

performing a chunking technique on the unstructured data to generate analyzed unstructured data; and assembling the synthesized responses based on the analyzed unstructured data.

16. The system of claim 13, wherein the input query comprises a conversational query in a natural spoken-language.

17. A method, comprising:

receiving an input query;

identifying an entity associated with the input query;

retrieving a data schema based on the entity;

generating a structured query language input based on the data schema;

determining an organization associated with the input query; and utilizing an organization semantics model to generate a response based on the structured query language input, wherein the organization semantics model is a language-learning model trained to generate organization-specific responses, and wherein the response utilizes terminology consistent with usage of the organization associated with the input query.

18. The method of claim 17, further comprising:

determining an optimal action plan comprising a sequence of steps to be executed to address the input query based on the structured query language input;

selecting one or more tools, agents, or workflows to perform defined tasks at each step;

synthesizing responses from the selected one or more tools, agents, or workflows to generate a summarized response; and generating a modified response comprising a subset of the synthesized responses.

19. The method of claim 18, further comprising updating a conversational storage database based on the modified response.

20. The method of claim 18, wherein the modified response comprises a natural spoken-language.

* * * * *